Patented Sept. 27, 1949

2,483,251

UNITED STATES PATENT OFFICE 2,483,251

CATALYTIC OXIDATION OF SORBOSE DERIVATIVES

Nelson R. Trenner, Westfield, N. J., assignor to Merck & Co., Inc., Rahway, N. J., a corporation of New Jersey No Drawing. Original application May 1, 1942, Serial No. 441,350. Divided and this application April 11, 1947, Serial No. 740,961

5 Claims. (Cl. 260—344.5)

This application is a division of my pending application Serial No. 441,350, filed May 1, 1942, now Patent No. 2,428,438, issued October 7, 1947.

This invention relates to ascorbic acid derivatives and their method of production.

In accordance with the invention, 2,3-acetone-laevosorbose is catalytically oxidized with oxygen or oxygen containing gases, using finely divided platinum as a catalyst. The reaction results in the formation of 2,3-acetone-2,5-furanose-laevo-gulosaccharic acid or salt thereof, in aqueous solution. The 2,3-acetone-2,5-furanose-laevo-gulosaccharic acid is recovered from the aqueous solution and treated in substantially solid form with concentrated hydrochloric acid yielding gulosaccharoascorbic acid which is recovered from the reaction mix. The catalytic oxidation of the 2,3-acetone-laevo-sorbose first results in the formation of an intermediate oxidation product, i. e., 4,5-acetone-2,5-furanose-dextrogluconic acid. If desired, therefore, the latter compound may be used as a starting material in accordance with the invention.

The reactions in accordance with the invention may be structurally represented as follows:

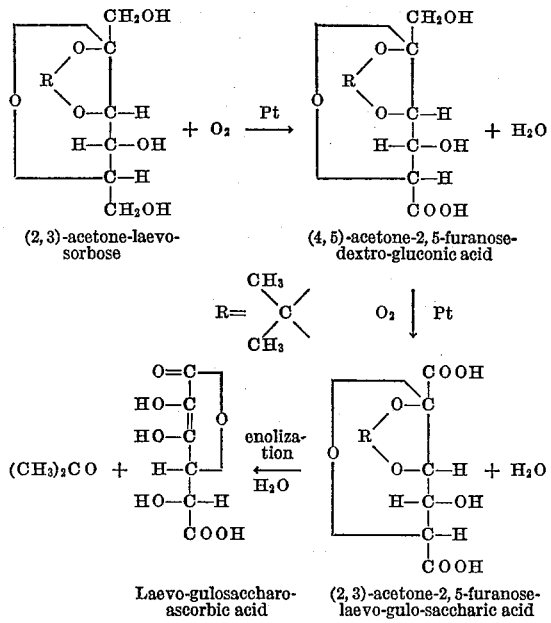

The catalyst may be either straight platinum black or a charcoal supported platinum black. The platinum black may be prepared by suitable reduction such as formaldehyde reduction in alkaline media, or hydrogen reduction. When using a charcoal supported platinum black, it is preferred to use about a 10% charcoal supported platinum black. The catalyst is of high stability and substantially maintains its efficiency in successive runs remaining approximately constant for as many as eight successive oxidations. The catalyst is very sensitive, however, to nitrogen-containing compounds which poison the same, and care, therefore, should be taken that all such compounds are kept away and that the air or oxygen used for the oxidation is thoroughly cleaned before entering the reaction vessel. I prefer to use a catalyst concentration of approximately 0.5 to 1.5 gm. platinum per liter of reaction mix. Higher concentrations of catalyst per liter reaction mix do not materially increase the yield of oxidation products. On the contrary, very high concentrations, such as approximately a concentration of 12 gms. platinum per liter, are productive of lesser yields, indicating destruction of the sorbose in other ways than desired.

In the following example the preparation of a platinum cataylst is furnished by way of illustration.

Example I 28.6 gms. of anhydrous sodium carbonate, 23 gms. of purified (using hydrochloric acid wash) animal charcoal, 9 gms. of chloroplatinic acid (calculated as: $H_2PtCl_6.6H_2O$) are put into a vessel and rapidly stirred until solution is complete. 14 cubic centimeters of 38% formaldehyde are added, stirring continued. The stirred mixture is heated to 80° C. and held at that temperature for 2 hours, then allowed to cool to room temperature and filtered. The catalyst mass is washed on the filter using successive batches—each of decreasing concentration—of boiling aqueous sodium chloride until the catalyst mass will tolerate hot pure water. This washing procedure is necessitated by the fact that the reduced platinum readily goes into colloidal dispersion if the catalyst mass is washed directly with pure water. Washing is continued until the washings are chloride free. The moist mass is air dried, sieved and stored in a closed container. Using the above proportions of charcoal to chloroplatinic acid gives a catalyst containing about 13% by weight of platinum.

For best results, I have found it of advantage to conduct the catalytic oxidation within a pH range of from 3.5 to 9.5. Outside these limits, the conversion rate falls off materially. I prefer to use a pH range of from 6 to 8.5. Buffering agents may be added to the reaction mix so as to assure the desired pH range. Such buffering agents may comprise, for instance, sodium bicarbonate, calcium carbonate, suitable phosphates, etc. The buffering agent should be so selected that it does not interfere with the reaction or subsequent isolation of reaction products.

In carrying out the reaction in practice, it is desirable to take advantage of temperature-concentration relationships. The higher the concentration, the higher should be the temperature of the reaction. With constant reaction temperatures, increasing 2,3-acetone-laevo-sorbose concentrations necessitate longer reaction times. With constant concentrations and increasing temperatures the reaction times become materially shorter. I prefer temperatures between 45° and 80° C. and concentrations not materially in excess of 0.4 molar amounts. Within the preferred application of my invention, I find it of advantage to use from 0.1 to 0.2 molar amounts of 2,3-acetone-laevo-sorbose concentration at a reaction temperature of approximately 45° to 65° C. and preferably 55° to 60° C.

The oxygen required for the catalytic oxidation in accordance with the invention may be added in the form of oxygen or oxygen-containing gas and preferably air. Any desired oxygen concentration and thus rate of gas flow may be used providing adequate distribution by violent mechanical agitation is secured. For the purpose of safeguarding the catalyst against poisons, it is preferred to purify the oxygen or oxygen-containing gas such as by passing the same through a suitable ignition train. When proceeding in accordance with the invention, the conversion to the 2,3-acetone-2,5-furanose-laevo-gulosaccharic acid may be as high as 85% complete.

Upon completion of the catalytic oxidation reaction, the platinum catalyst is separated either by filtration, settling, centrifuging, or other suitable means, whereupon the aqueous substrate is worked up to recover therefrom the 2,3-acetone-2,5-furanose-laevo-gulosaccharic acid. If the pH range maintained during the catalytic oxidation is such that the reaction mix after completed conversion is on the alkaline side, the 2,3-acetone-2,5 - furanose-laevo - gulosaccharic acid will be present in the form of a salt and the same must be suitably acidified in the working up process so as to obtain the free acid.

The aqueous substrate containing the 2,3-acetone-2,5-furanose-laevo-gulosaccharic acid or acid salt is worked up to obtain therefrom the free acid. This may be accomplished by way of the preferred embodiment of my invention, by evaporation of the aqueous substrate, preferably in vacuo and preferably at temperatures below 35° C. to, for instance, a volume of about one-tenth the original. The chilled concentrate is admixed with sufficient concentrated hydrochloric acid to bring the pH of the solution to a point between pH 1 and pH 3, and preferably to a pH of 1. The acidified concentrate is intimately contacted with a suitable organic solvent, preferably prechilled, such as ethyl acetate, to extract the 2,3-acetone-2,5-furanose-gulosaccharic acid therefrom. It is preferred to utilize a procedure of exhaustive extraction with successive portions of the solvent. The solvent extracts, preferably dried, are evaporated to crystallization concentrations and the 2,3-acetone-2,5-furanose-gulosaccharic acid recovered therefrom.

The free 2,3-acetone-2,5-furanose-laevo-gulosaccharic acid may be converted into the laevo-gulosaccharoascorbic acid by splitting off the acetone and thereafter subjecting the acetone-free product to a lactonization and enolization reaction. Within the scope of my invention and as a preferred embodiment thereof, I may accomplish the splitting off of acetone and the lactonization and enolization reaction substantially in a single step operation. In accordance with this embodiment of my invention, the free 2,3-acetone-2,5-furanose-gulosaccharic acid is treated in solid form with concentrated hydrochloric acid. This treatment involves heating at a temperature between 70° and 80° C. and preferably 75° to 76° C. The duration of the heating is critical. In view of the fact that the laevo-gulosaccharoascorbic acid is relatively unstable in hydrochloric acid at the concentration and temperatures involved in the reaction, the duration of the heating should be so controlled that there is a maximum conversion to laevo-gulosaccharoascorbic acid and minimum formation of degradation products. The most advantageous heating period may vary depending, inter alia, upon the reaction conditions including amounts of reagents and temperatures selected. It is a simple matter, however, to empirically determine for each given set of conditions a preferred heating period. For relatively small amounts, heating periods from 30 to 50 minutes and preferably heating periods of 40 minutes will give satisfactory results. The amount of hydrochloric acid used is not critical. It is preferred, however, not to use excessive amounts so as not to require a necessary evaporation in the subsequent concentration step.

Depending upon the length and temperature of reaction, the latter is accompanied by more or less marked darkening of the liquid during the conversion and it is preferred therefore to add charcoal shortly before the expiration of the reaction time. The charcoal removes the colored matter almost completely and the substrate containing the laevo-gulosaccharoascorbic acid is substantially colorless. With favorable reaction conditions such as heating for instance 0.1 to 0.2 molar amounts per liter for periods of from 30 to 50 and preferably for 40 minutes at 75° to 76° C., a lightly colored solution results, which requires relatively little carbon for its decolorization and which is, therefore, capable of furnishing greater yields of laevo-gulosaccharoascorbic acid. Inasmuch as a certain amount of instability attends hydrochloric acid solutions of this acid, at temperatures of 30° C., or higher, it is preferred to immediately cool the hydrochloric acid laevo-gulosaccharoascorbic acid solution to 0° C. and to then filter off the charcoal. The filtrate is evaporated preferably in vacuo and preferably in an inert atmosphere such as a carbon dioxide atmosphere to a relatively small volume. The concentration is effected preferably until such point is reached at which an azeotropic aqueous hydrochloric acid mix maintains.

I have discovered within the scope of my invention and as a further embodiment thereof that laevo-gulosaccharoascorbic acid possesses a minimum solubility in aqueous hydrochloric acid of about 20.24% HCl content and preferably in an aqueous hydrochloric acid of substantially azeotropic concentration, i. e., "a constant boiling" acid. Therefore, when concentrating the laevo-gulosaccharoascorbic acid hydrochloric acid solution such as by evaporation, to a small volume, maximum crystallization and thus yield of ascorbic acid is obtained by adjusting the hydrochloric acid concentration to that of minimum solubility for the laevo-gulosaccharoascorbic acid. As a rule, this desideratum is obtained by the vacuum evaporation referred to. Though gulosaccharoascorbic acid is relatively unstable in hydrochloric acid solution and particularly unstable in the concentration required for crystallization, such instability is at a minimum at temperatures below 30° C. and preferably at 0° C. and the yields of laevo-gulosaccharoascorbic acid are not impaired by the use of hydrochloric acid solutions of the specified concentration, used as a crystallizing medium in accordance with the procedure herein referred to. Crystallization is preferably permitted to proceed at relatively low temperatures and if available, an ice room may be used. The laevo-gulosaccharoascorbic acid crystallizes in the form of white crystals that can be isolated by filtration and washing with acetone.

The following example illustrates the catalytic oxidation of 2,3-acetone-laevo-sorbose in accordance with my invention.

*Example II*

A solution 0.15 molar with respect to 2,3-acetone-laevo-sorbose, 0.18 molar with respect to sodium bicarbonate, and containing 6.8 gms. of the platinum catalyst (obtained in accordance with Example I) per liter of such solution, is put into a closed vessel equipped with an agitator and a gas inlet at its base. During reaction the solution is continuously and violently agitated in such a manner as to break up the incoming bubbles as finely as possible. This is important if high rates of oxidation are to be attained. Air which has been previously passed through an ignition train consisting of finely divided cupric oxide held at about 550° C., and then passed through a dust filter is forced into the vessel through the gas inlet at a rate of 3 cubic centimeters per second per liter of reaction solution. During oxidation the reaction mixture is held at between 55 and 60° C. using a water bath surrounding the oxidation vessel for this purpose. The amount of sodium bicarbonate used approximates that of one equivalent, and imparts to the solution a pH of about 8 to 8.5. As the reaction progresses the sodium bicarbonate is used up and the pH drops, reaching about 7 with the oxidation of one of the $CH_2OH$ radicals. If the oxidation is to proceed to the dicarboxylic acid, the pH is preferably brought back to about 8 to 8.5 by adding a further equivalent of sodium bicarbonate. It is not recommended to add two equivalents of sodium bicarbonate in the beginning as this would impart to the medium too high a pH which tends to cause undesired side reactions. The preferred reaction range is at pH values between 7 and 8.5.

With a catalyst of the proper activity the oxidation is about 85% complete in 48 to 50 hours for the 2,3-acetone-2,5-furanose-laevo gulosaccharic acid. Following completion of the oxidation, the catalyst is allowed to settle and a clear colorless solution is siphoned off through a filter cloth into a vacuum still for concentration. About one liter is thus recovered.

The filtered aqueous solution is then concentrated in vacuo at a temperature below 35° C. to about one-tenth the initial volume. The concentrate is chilled preferably in an ice bath and concentrated hydrochloric acid, preferably chilled, is added to bring the pH of the solution to about 1. The mixture is then immediately exhaustively extracted, with ethyl acetate, preferably chilled, and preferably using successive portions. As the gulosaccharic acid product is relatively unstable in acid solution, it is preferred to carry out and conclude the extraction as rapidly as possible and at relatively low temperatures. The combined ethyl acetate extracts are dried using anhydrous sodium sulphate, filtered and evaporated on a steam bath until crystallization starts. The mixture is cooled and allowed to crystallize. The product is filter-sucked as dry as possible and washed with a little ether. The product melts with decomposition between 155° and 165° C.

If desired, the oxidation, as exemplified in the preceding example, may be interrupted with the oxidation of one terminal $CH_2OH$ and a monocarboxylic acid may be recovered. This monobasic acid constituting 4,5-acetone-2,5-furanose-dextro-gluconic acid has a melting point of 163° to 164° C. without decomposition.

The following example is furnished in illustration of the conversion of 2,3-acetone-2,5-furanose-laevo-gulosaccharic acid to laevo-gulosaccharoascorbic acid.

*Example III*

200 gms. of the compound of melting point 155° to 165° C., obtained as described in Example II, are dissolved in approximately one liter of concentrated hydrochloric acid (35 to 38% HCl), and the whole heated for 40 minutes at 75° C. after 35 minutes of heating, 20 gms. of decolorizing carbon are added with stirring. The entire batch is quickly cooled in an ice bath at the expiration of the 40 minute heating period, and is filtered cold at temperatures below 30° C. The filtrate is practically colorless and is concentrated to about one-tenth its original volume by evaporation in vacuo at a temperature of less than 30° C. Upon storage at relatively low temperatures and preferably in an ice bath or ice room for about 15 hours, crystallization of laevo-gulosaccharoascorbic acid is complete. The laevo-gulosaccharoascorbic acid is filtered off cold and sucked as dry as possible. The hydrochloric acid concentration at the time of crystallization is that of a constant boiling hydrochloric acid (20.24% HCl). The single crystallization yields approximately 80% to 85% of the total laevo-gulosaccharoascorbic acid present in the crystallization medium. Additional laevo-gulosaccharoascorbic acid may be obtained by reworking the mother liquors. Alternatively, the laevo-gulosaccharoascorbic acid yield may be increased by re-using the mother liquors for successive batches of material. The crude crystalline product may be purified by recrystallization from boiling acetone whence a pure white product is obtained. This product has a melting point of 206° to 210° C., with decomposition.

The laevo-gulosaccharoascorbic acid obtained in accordance with my invention has valuable anti-oxidant properties. It may be converted, if desired, into laevo-ascorbic acid by reduction.

Throughout the specification and claims the terms "dextro" and "laevo" are used to denote the configuration of the carbohydrate derivatives and are used without relation to the optical rotation of the particular compounds.

Modifications may be made in carrying out the present invention, without departing from the spirit and scope thereof, and I am to be limited only by the appended claims.

I claim:

1. Laevo-gulosaccharo ascorbic acid of the formula

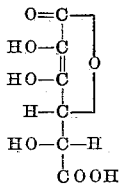

2. The process that consists of heating 2,3-acetone-2,5-furanose-laevo-gulosaccharic acid with concentrated hydrochloric acid at a temperature of 70–80° C. for about 30 to 50 minutes, and recovering laevo-gulosaccharoascorbic acid.

3. The process that consists of heating 2,3-acetone-2,5-furanose-laevo-gulosaccharic acid with concentrated hydrochloric acid at a temperature of 75–76° C. for about 40 minutes, and recovering laevo-gulosaccharoascorbic acid.

4. The process that consists of heating 2,3-acetone-2,5-furanose-laevo-gulosaccharic acid with concentrated hydrochloric acid at a temperature of 75–76° C. for about 40 minutes, quickly cooling the reaction mixture to a temperature below 30° C., evaporating the same to small volume under vacuum, and crystallizing laevo-gulosaccharoascorbic acid therefrom.

5. The process that consists of heating 2,3-acetone-2,5-furanose-laevo-gulosaccharic acid with concentrated hydrochloric acid at a temperature of 75–76° C. for about 40 minutes, quickly cooling the reaction mixture to about 0° C., evaporating the same to small volume under vacuum, and crystallizing laevo-gulosaccharoascorbic acid therefrom.

NELSON R. TRENNER.

REFERENCES CITED

The following references are of record in the file of this patent:

UNITED STATES PATENTS

| Number | Name | Date |
|---|---|---|
| 2,140,480 | Reichstein | Dec. 13, 1938 |
| 2,190,377 | Dalmer et al. | Feb. 13, 1940 |
| 2,301,811 | Reichstein | Nov. 10, 1942 |
| 2,350,435 | Wells | June 6, 1944 |
| 2,367,251 | Weylard et al. | Jan. 16, 1945 |
| 2,428,438 | Trenner | Oct. 7, 1947 |